UNITED STATES PATENT OFFICE.

WILLIAM RENNYSON, OF NORRISTOWN, PENNSYLVANIA.

FLUX.

SPECIFICATION forming part of Letters Patent No. 369,961, dated September 13, 1887.

Application filed September 2, 1886. Serial No. 212,496. (No specimens.)

*To all whom it may concern:*

Be it known that I, WILLIAM RENNYSON, a citizen of the United States, residing in Norristown, Pennsylvania, have invented an Improved Flux, of which the following is a specification.

The object of my invention is to provide an economical but efficient fluxing material for smelting ores in blast-furnaces. &c.; and this object I attain by the utilization for that purpose of the waste sludge resulting from the boiling of carbonated alkalies with caustic lime—as, for instance, in paper-works. In the manufacture of paper, for example, more particularly from wood and straw, it is customary to boil the stock in a solution of soda-ash or carbonate of soda combined with lime. After the boiling operation the soda-ash is generally recovered from the solution, leaving a "sludge," which is considered as a waste material. This waste sludge is composed of over one-half carbonate of lime, a little over one-tenth quicklime, and one-fifth vegetable charcoal, together with a small quantity of impure carbonate of soda and some slight traces of silica. These proportions of course vary in different cases. In some instances the soda-ash or carbonate of soda is not recovered from the solution, so that in such case the waste would contain a larger proportion of carbonate of soda. Generally, however, the alkaline carbonate is recovered to a greater or less extent for reasons of economy; but, whether it be recovered or not, I have found that the waste sludge will form a good fluxing material in the smelting of ores, because, while the lime contained in the waste acts as the flux, the charcoal contained in it serves for fuel, and a less quantity of the material is needed than when lime is used in the ordinary way, and less fuel is required for reducing the ores.

The sludge may be used in the raw form in which it comes from the paper-works, or it may be prepared for convenience of transportation or use by drying, pressing into lumps or bricks, or in any way found desirable.

I claim as my invention—

The herein-described flux for smelting ores, said flux consisting of the waste sludge from the boiling of carbonated alkalies with caustic lime, and containing carbonate of lime, quicklime, and vegetable charcoal, substantially as set forth.

In testimony whereof I have signed my name to this specification in the presence of two subscribing witnesses.

WILLIAM RENNYSON.

Witnesses:
WILLIAM D. CONNER,
ARCHER McLEAN.